United States Patent
Wang et al.

(10) Patent No.: US 8,390,704 B2
(45) Date of Patent: Mar. 5, 2013

(54) IMAGE DEBLURRING USING A SPATIAL IMAGE PRIOR

(75) Inventors: Sen Wang, Rochester, NY (US); Hou Tingbo, Stony Brook, NY (US); Rodney L. Miller, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 692 days.

(21) Appl. No.: 12/580,569

(22) Filed: Oct. 16, 2009

(65) Prior Publication Data

US 2011/0090352 A1   Apr. 21, 2011

(51) Int. Cl.
*H04N 9/64* (2006.01)
*G06K 9/40* (2006.01)

(52) U.S. Cl. ........................... 348/248; 382/255

(58) Field of Classification Search ............... 348/208.6, 348/208.4, 241, 78, 248, 208.12, 208.13; 382/255, 275, 264
See application file for complete search history.

(56) References Cited

U.S. PATENT DOCUMENTS

| | | | |
|---|---|---|---|
| 3,971,065 | A | 7/1976 | Bayer |
| 4,876,591 | A | 10/1989 | Muramatsu |
| 7,239,342 | B2 | 7/2007 | Kingetsu et al. |
| 2006/0017837 | A1 | 1/2006 | Sorek et al. |
| 2006/0093234 | A1* | 5/2006 | Silverstein .................... 382/255 |
| 2006/0187308 | A1* | 8/2006 | Lim et al. .................... 348/208.4 |
| 2007/0046807 | A1 | 3/2007 | Hamilton et al. |
| 2007/0223831 | A1 | 9/2007 | Mei et al. |
| 2008/0025627 | A1* | 1/2008 | Freeman et al. ............. 382/255 |
| 2008/0240607 | A1 | 10/2008 | Sun et al. |
| 2009/0179995 | A1* | 7/2009 | Fukumoto et al. .......... 348/208.6 |
| 2010/0201798 | A1* | 8/2010 | Ren et al. ......................... 348/78 |

FOREIGN PATENT DOCUMENTS

WO    WO 2008/106282 A1    9/2008

OTHER PUBLICATIONS

W.H. Richardson, "Bayesian-based iterative method of image restoration," Journal of the Optical Society of America, vol. 62, , pp. 55-59, 1972.
L. B. Lucy, "An iterative technique for the rectification of observed distributions," Astronomical Journal, vol. 79, pp. 745-754, 1974.
Donatelli et al., "Improved image deblurring with anti-reflective boundary conditions and re-blurring," Inverse Problems, vol. 22, pp. 2035-2053, 2006.
Yuan, et al., "Progressive inter-scale and intra-scale non-blind image deconvolution," ACM Transactions on Graphics, vol. 27, Iss. 3, 2008.
Fergus et al., "Removing camera shake from a single photgraph," ACM Transactions on Graphics, vol. 25, pp. 787-794, 2006.

(Continued)

*Primary Examiner* — Chieh M Fan
*Assistant Examiner* — Akshay Trehan
(74) *Attorney, Agent, or Firm* — Kevin E. Spaulding (57) ABSTRACT

A method for determining a deblurred image, the method implemented at least in part by a data processing system and comprising: receiving a sharp image of a scene captured with a short exposure time; receiving a blurred image of the scene captured with a longer exposure time than the sharp image, wherein the blurred image has a higher level of motion blur and a lower level of image noise than the sharp image; determining a blur kernel responsive to the sharp image and the blurred image; determining one or more reference differential images responsive to the sharp image; determining a deblurred image responsive to the blurred image, the blur kernel and the one or more reference differential images; and storing the deblurred image in a processor-accessible memory system.

21 Claims, 5 Drawing Sheets

OTHER PUBLICATIONS

Shan et al., "High Quality motion deblurring from a single image," ACM Transactions on Graphics, vol. 27, pp. 1-10, 2008.
Levin, et al., "Understanding and evaluating blind deconvolution algorithms," Proc. IEEE Conf. on Computer Vision and Pattern Recognition, 2009.
Rav-Acha, et al., "Two motion-blurred images are better than one," Pattern Recognition Letters, vol. 36, pp. 211-217, 2005.
Liu, et al., "Simultaneous image formation and motion blur restoration via multiple capture," Proc. International Conference Acoustics, Speech, Signal Processing, pp. 1841-1844, 2001.
Ben-Ezra, et al., "Motion deblurring using hybrid imaging,"Proc. IEEE Conf. on Computer Vision and Pattern Recognition, vol. 1, pp. 657-664, 2003.
Rasker, et al., "Coded exposure photography: motion deblurring using fluttered shutter," ACM Transactions on Graphics, vol. 25, pp. 795-804, 2006.
Yuan et al., "Image deblurring with burred/noisy image pairs," ACM Transactions on Graphics, vol. 26, Iss. 3, 2007.
Levin et al., "Image and depth from a conventional camera wit a coded aperture," ACM Transactions on Graphics, vol. 26, Issue 6, 2007.
Marius Tico et al.: "Image Stabilization Based on Fusing the Visual Information in Differently Exposed Images", Proceedings 2007 IEEE International Conference on Image Processing, ICIP 2007, Feb. 1, 2007, pp. 117-120, XP002609057, IEEE Piscataway, NJ, USA, ISBN: 978-1-4244-1436-9, Sections 1-2, p. 3.
Marius Tico et al.: "Motion Blur Identification Based on Differently Exposed Images", 2006 International Conference on Image Processing, Oct. 11, 1996, pp. 2021-2024, XP002609058, IEEE Piscataway, NJ, USA, ISBN: 1-4244-0481-9, Section 2, Abstract.

* cited by examiner

IMAGE DEBLURRING USING A SPATIAL IMAGE PRIOR

CROSS-REFERENCE TO RELATED APPLICATIONS

Reference is made to commonly assigned, co-pending U.S. Patent Application Publication No. 2011/0090378, entitled: "Image deblurring using panchromatic pixels", by Sen et al., which is incorporated herein by reference.

FIELD OF THE INVENTION

This invention pertains to the field of image deblurring and more particularly to a method for determining a deblurred image using a first sharp image captured with a short exposure time and a second blurred image of the scene captured with a longer exposure time.

BACKGROUND OF THE INVENTION

One common source of image blur in digital imaging is the relative motion between a camera and a scene during the exposure time (integration time) associated with image capture. This type of image blur is sometimes called "motion blur" or "smear." Motion blur typically occurs when the light level in the image capture environment is dim, thus necessitating a long exposure time.

One approach to reduce motion blur is to use an electronic flash to supplement the natural illumination. However, this is only effective when the subject is relatively close to the camera. Additionally, many users find that flash photography provides a less satisfactory experience.

Another approach to reducing the problem of motion blur is to improve the light sensitivity of electronic image sensors in order to reduce the exposure time during image capture. While much progress has been made in this area in recent years, the light sensitivity of currently available electronic image sensors is not high enough to prevent motion blur in many image capture environments.

One factor that reduces the light sensitivity of electronic image sensors is the use of color filters placed over the sensors to enable the formation of color images. For example, the well-known "Bayer pattern" taught in U.S. Pat. No. 3,971,065 to Bayer, teaches the use of a repeating array of red, green and blue color filters to detect color image signals. While this general approach is used today in most consumer digital cameras, the color filter array (CFA) has the undesirable effect of throwing away about ⅔ of the incident light, and therefore substantially reduces the photographic speed of the imaging system.

U.S. Pat. No. 4,876,591 to Muramatsu discloses an electronic imaging system that includes a beam-splitter and two different sensors, wherein one sensor has no color filters and the other sensor includes a pattern of color filters. The sensor without the color filters provides for increased light sensitivity, while the other sensor provides color information. Although this system improves the light sensitivity over a single conventional image sensor, the overall complexity, size, and cost of the system is greater due to the need for two sensors and a beam splitter. Furthermore, the beam splitter directs only half the light from the image to each sensor, limiting the improvement in photographic speed.

U.S. Patent Application Publication No. 2007/0046807 to Hamilton, et al., teaches a digital image system using a single sensor having some color image pixels with color filters and some panchromatic image pixels having no color filters. An interpolation algorithm is used to reconstruct a full-color image where the higher speed panchromatic image pixels provide the image detail information. While this approach can reduce motion blur to some extent by enabling shorter exposure times, there will still be some level of motion blur in many low-light imaging scenarios.

Another method to reduce the affect of motion blur in digital images is to use an image enhancement algorithm to compensate for blur in the captured image. Such algorithms are often referred to as "deblurring" or "deconvolution" algorithms. Such algorithms can be roughly classified into two categories: "blind" and "non-blind". If a blur kernel associated with the image blur is not known, then the problem is said to be "blind deconvolution," whereas when the blur kernel is known it is said to be "non-blind deconvolution."

For non-blind deconvolution, the most common technique is Richardson-Lucy (RL) deconvolution. (See the articles: W. H. Richardson, "Bayesian-based iterative method of image restoration," Journal of the Optical Society of America, Vol. 62, pp. 55-59, 1972, and L. B. Lucy, "An iterative technique for the rectification of observed distributions," Astronomical Journal, vol. 79, pp. 745-754, 1974.) This method involves the determination of a deblurred image (sometimes referred to as a "latent image") under the assumption that its pixel intensities conform to a Poisson distribution.

In the article "Improved image deblurring with anti-reflective boundary conditions and re-blurring" (Inverse Problems, Vol. 22, pp. 2035-2053, 2006), Donatelli et al. use a Partial Differential Equation (PDE)-based model to recover a deblurred image with reduced ringing by incorporating an anti-reflective boundary condition and a re-blurring step.

In the article "Progressive inter-scale and intra-scale non-blind image deconvolution" (ACM Transactions on Graphics, Vol. 27, Iss. 3, 2008), Yuan, et al. disclose a progressive inter-scale and intra-scale non-blind image deconvolution approach that significantly reduces ringing.

Blind deconvolution is an ill-posed problem, which is significantly more challenging. Approaches to pure blind deconvolution apply to either single blurred image or multiple blurred images. The most challenging problem is single-image blind deblurring, which requires the simultaneous estimation of the deblurred image and the Point Spread Function (PSF) associated with the image blur.

In the article "Removing camera shake from a single photograph" (ACM Transactions on Graphics, Vol. 25, pp. 787-794, 2006), Fergus et al. show that blur kernels are often complex and sharp. They teach an ensemble learning approach to recover a blur kernel, while assuming a certain statistical distribution for natural image gradients.

In the article "High-quality motion deblurring from a single image" (ACM Transactions on Graphics, Vol. 27, pp. 1-10, 2008), Shan et al. disclose a method for removing motion blur using a unified probabilistic model of both blur kernel estimation and unblurred image restoration.

In the article "Understanding and evaluating blind deconvolution algorithms" (Proc. IEEE Conf. on Computer Vision and Pattern Recognition, 2009), Levin, et al. described and evaluated a number of single-image blind deconvolution algorithms.

Having multiple blurred images can provide additional constraints to improve the deblurring process. In the article "Two motion-blurred images are better than one" (Pattern Recognition Letters, Vol. 36, pp. 211-217, 2005), Ray-Acha, et al. teach the use of images with different blurring directions to provide improved kernel estimation.

Recently, another type of blind deconvolution has been disclosed that employs additional information besides the blurred image to improve the deconvolution. This method can be categorized as "quasi-blind deconvolution." In the article "Simultaneous image formation and motion blur restoration via multiple capture" (Proc. International Conference Acoustics, Speech, Signal Processing, pp. 1841-1844, 2001), Liu, et al. teach using a CMOS sensor to capture multiple high-speed frames within a normal exposure time. Image pixels having motion blur are replaced with the pixels from one of the high-speed frames.

In the article "Motion deblurring using hybrid imaging" (Proc. IEEE Conf. on Computer Vision and Pattern Recognition, Vol. 1, pp. 657-664, 2003), Ben-Ezra, et al. disclose a hybrid camera that simultaneously captures a high-resolution image together with a sequence of low-resolution images that are temporally synchronized. With this method, optical flow is derived from the low-resolution images to estimate the global motion blur of the high-resolution image.

In the article "Coded exposure photography: motion deblurring using fluttered shutter" (ACM Transactions on Graphics, Vol. 25, pp. 795-804, 2006), Rasker, et al. disclose a "fluttered shutter" camera, which opens and closes the shutter during a normal exposure time with a pseudo-random sequence. The flutter changes the normal "box filter" to a broad-band filter that preserves high-frequency spatial details in the blurred image. As a result, the corresponding deconvolution becomes a well-posed problem.

In the paper "Image deblurring with blurred/noisy image pairs" (ACM Transactions on Graphics, Vol. 26, Issue 3, 2007), Yuan et al. have disclosed a method of image deblurring using blurred and noisy image pairs. Each image pair contains a blurred image captured with a long exposure time, and a noisy image captured with a short exposure time. The noise associated with the short exposure time image can be severe under low light condition, and therefore the deblurring results are highly depend on the performance of a denoising operation.

In the article "Image and depth from a conventional camera with a coded aperture" (ACM Transactions on Graphics, Vol. 26, Issue 6, 2007), Levin et al. employ a coded to obtain an approximate blur kernel which can be used in a deblurring algorithm. This deblurring approach is limited to image blur caused by defocus.

SUMMARY OF THE INVENTION

The present invention represents a method for determining a deblurred image, the method implemented at least in part by a data processing system and comprising:

a) receiving a sharp image of a scene captured with a short exposure time;

b) receiving a blurred image of the scene captured with a longer exposure time than the sharp image, wherein the blurred image has a higher level of motion blur and a lower level of image noise than the sharp image;

c) determining a blur kernel responsive to the sharp image and the blurred image;

d) determining one or more reference differential images responsive to the sharp image;

e) determining a deblurred image responsive to the blurred image, the blur kernel and the one or more reference differential images; and f) storing the deblurred image in a processor-accessible memory system.

This invention has the advantage that it produces deblurred images having a lower noise level than the sharp image, but having a higher sharpness level than the blurred image.

It has the additional advantage that it produces deblurred images having fewer ringing artifacts than prior art deblurring algorithms.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image file", as used herein, refers to any digital image file, such as a digital still image or a digital video file.

Figure 1:
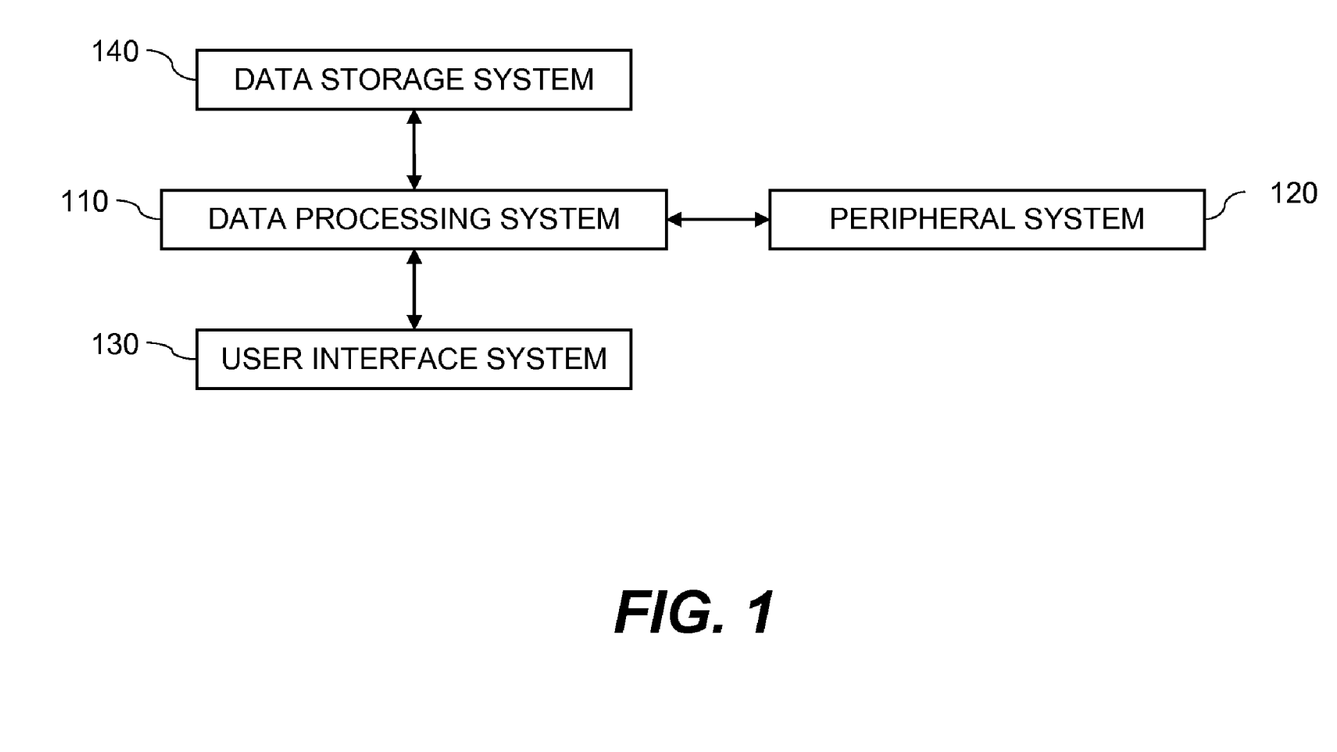
FIG. 1 is a high-level diagram showing the components of a system for classifying digital image according to an embodiment of the present invention.

FIG. 1 is a high-level diagram showing the components of a system for determining a deblurred image according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
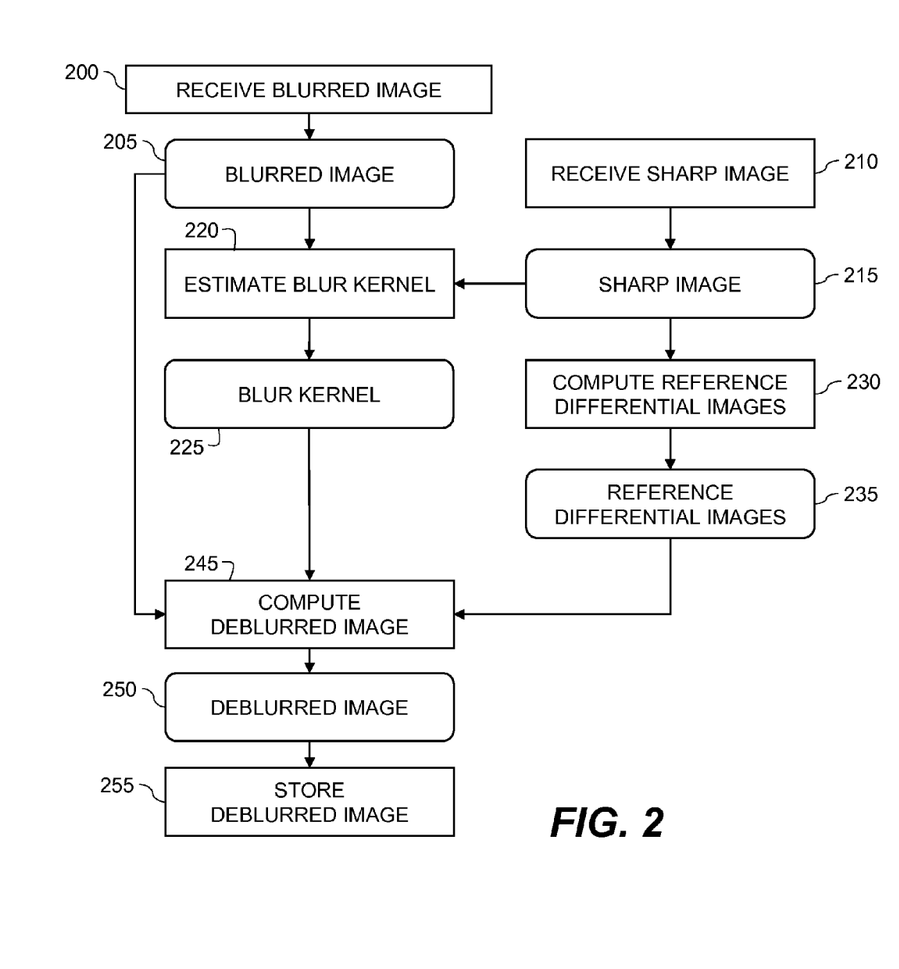
FIG. 2 is a flowchart for a preferred embodiment of the present invention.

The present invention will now be described with reference to FIG. 2. A receive blurred image step 200 is used to receive a blurred image 205, and a receive sharp image step 210 is used to receive a sharp image 215. Next an estimate blur kernel step 220 is used to determine a blur kernel 225 responsive to the blurred image 205 and the sharp image 215. The blur kernel 225 is a convolution kernel that could be applied to the sharp image 215 to produce an image having sharpness characteristics approximately equal to the blurred image 205. Next a compute reference differential images step 230 is used to compute a set of one or more reference differential images 235 from the sharp image 215. The set of reference differential images 235 can include gradient images computed by calculating numerical derivatives in different directions (e.g., x and y) or gradient images computed by calculating numerical derivatives with different pixel intervals (e.g., $\Delta x=1, 2, 3$). Next a compute deblurred image step 245 is used to compute the deblurred image 250 responsive to the blurred image 205, the blur kernel 225 and the reference differential images 235. As will be described in more detail later, in a preferred embodiment of the present invention, the compute deblurred image step 245 employs a Bayesian inference method using Maximum-A-Posterior (MAP) estimation. Finally, a store deblurred image step 255 is used to store the resulting deblurred image 250 in a processor-accessible memory. The processor-accessible memory can be any type of digital storage such as RAM or a hard disk.

Figure 3:
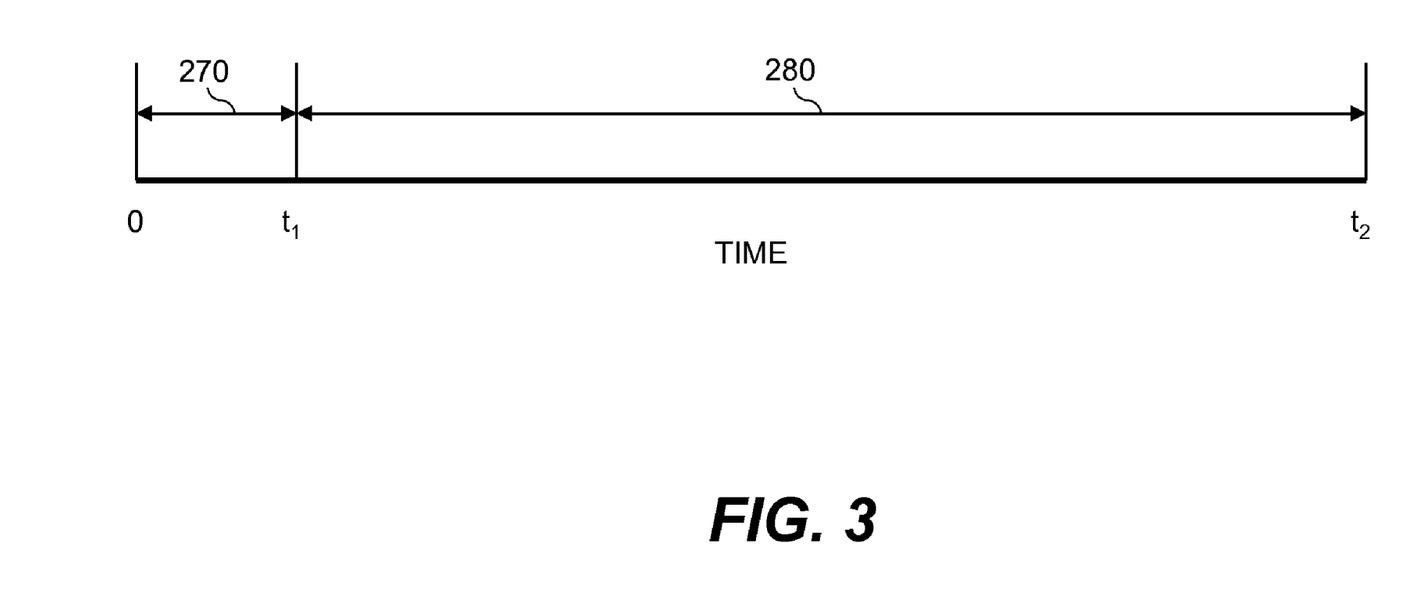
FIG. 3 is a timing diagram for capturing a pair of images with short and long exposure times.

In one embodiment of the present invention, the blurred image 205 and the sharp image 215 are captured using a digital camera using two sequential exposures. The sharp image 215 is captured using a short exposure time to provide an image with a low level of motion blur. However, this image will generally have a high level of image noise, particularly when scenes are photographed having a low level of illumination. The blurred image 205 is captured using a longer exposure time to provide an image with a low level of image noise. However, if there is any relative motion between the camera and objects in the scene during the time of the exposure, the blurred image 205 will have a higher level of motion blur. An example of a timing diagram for capturing a pair of images with short and long exposure times is shown in FIG. 3. A short exposure time 270 (between times $t=0$ and $t=t_1$) is used to capture the sharp image 215. A second longer exposure time 280 (between times $t=t_1$ and $t=t_2$) is used to capture the blurred image 205. The exposure times can be controlled by adjusting the integration time for a digital sensor, or alternately by controlling a shutter. In a preferred embodiment of the present invention, the two images are captured by the digital camera in response to a single button press.

Figure 4:
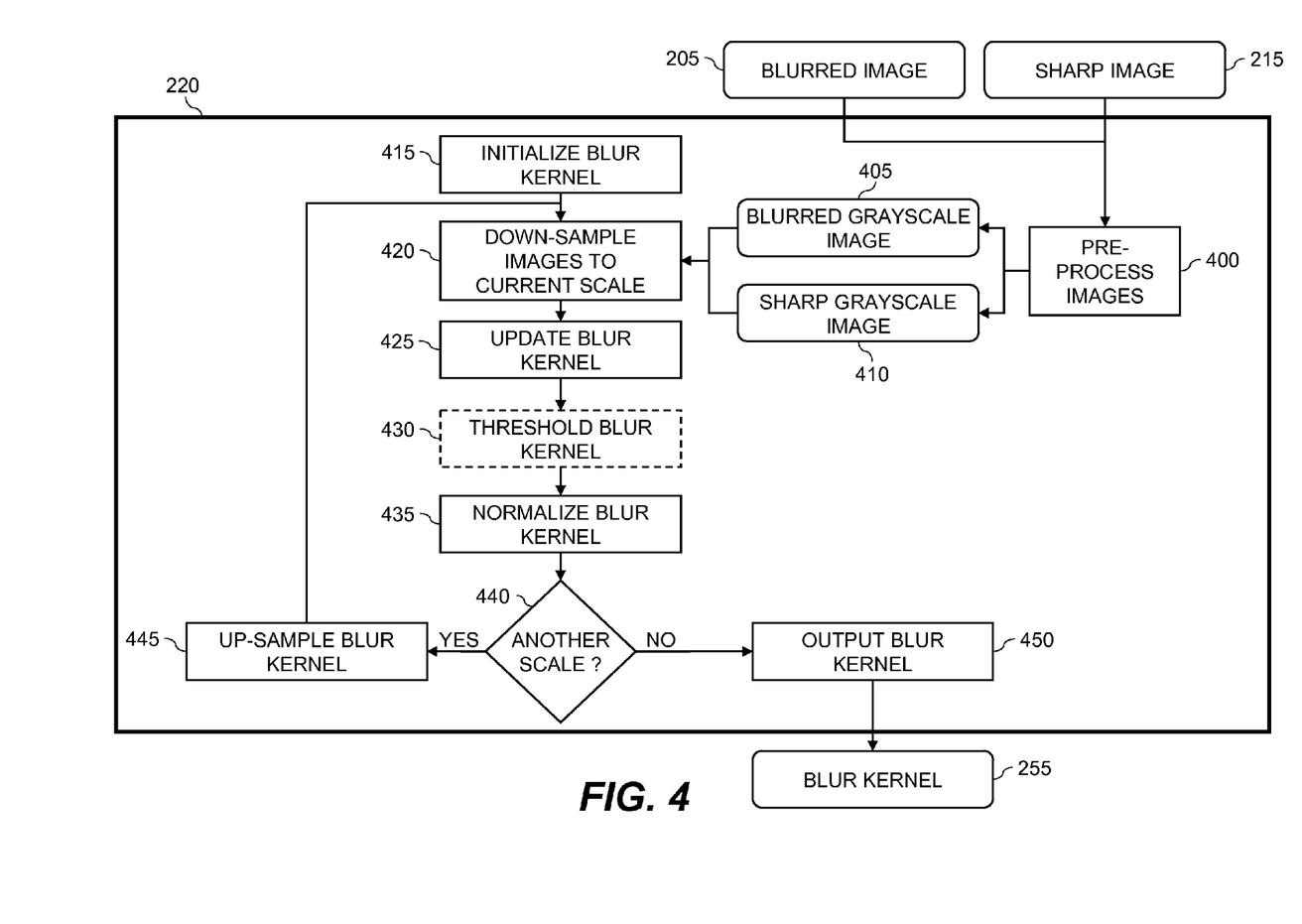
FIG. 4 is a flowchart showing additional details for the estimate blur kernel step in FIG. 2 according to a preferred embodiment of the present invention.

FIG. 4 shows a flow chart giving more details of the estimate blur kernel step 220 according to a preferred embodiment of the present invention. Since the blur kernel will generally be independent of the color channel, it is generally preferable to determine the blur kernel using grayscale versions of the blurred image 205 and the sharp image 215. A pre-process images step 400 is used to compute a blurred grayscale image 405 from the blurred image 205 and to compute a sharp grayscale image 410 from the sharp image 215. The conversion from a color image to a grayscale image can be performed using any method known in the art. In a preferred embodiment of the present invention, the grayscale images are determined by performing a weighted summation of the color channels:

$$P = a_R R + a_G G + a_B B \qquad (1)$$

where R, G and B are pixel values for the red, green and blue color channels of the input image, respectively, $a_R$, $a_G$ and $a_B$ are constants, and P is a pixel value of the grayscale image.

The pre-process images step 400 can also perform other functions in addition to converting the images to a grayscale format. For example, the pre-process images step 400 can apply a denoising algorithm to the sharp image 215 to reduce the noise level. There are many denoising algorithms that are well known in the art, such as median filtering algorithms.

The pre-process images step 400 can also apply a tone scale adjustment process to equalize the signal levels for the two images. Histogram equalization is one example of a tone scale adjustment process that is well-known in the art.

The pre-process images step 400 can also be used to apply an affine transform to either the blurred image 205 or the sharp image 215 to better align it with other image. This can be used to account for movement of the camera or the scene between the times that the two images were captured.

The pre-process images step 400 can also be used to crop out a subset of the blurred image 205 and a corresponding subset the sharp image 215 to increase the computational efficiency. Preferably, an image region having significant image detail (high deviations of intensity) is selected since that is where the effect of the motion blur will be most significant. Such an image region can be determined by applying a Laplacian operator to the blurred image 205 to form a Laplacian image, and then selecting a region of the Laplacian image having high signal levels. Optionally the Laplacian image can be determined by applying the Laplacian operator to the sharp image 215, or to both the blurred image 205 and the sharp image 215. The selected image region can be a contiguous image region, such as a rectangular region of a particular size, or alternately, the selected image region can comprise a subset of image pixels scattered throughout the image, such as a neighborhoods of image pixels surrounding image pixels in the Laplacian image where the magnitude exceeds a predefined threshold. In an alternate embodiment of the present invention, the image region can be manually user-selected.

In a preferred embodiment of the present invention, the blur kernel 225 is determined with a Bayesian inference method using Maximum-A-Posterior (MAP) estimation. Using this method the blur kernel 225 is determined by defining an energy function of the form:

$$E(K) = (P_B - P_S \otimes K)^2 + \lambda_3 \|K\|_1. \quad (2)$$

where $P_B$ is the blurred grayscale image 405, $P_S$ is the sharp grayscale image 410, K is the blur kernel 225, $\lambda_3$ is a weighting factor, $\otimes$ is a convolution operator, $\|\bullet\|_1$ is 1-norm operator, E(K) is the energy value, which is a function of the blur kernel. It can be seen that this energy function includes a first term that is a function of a difference between the blurred image ($P_B$) and a candidate blurred image determined by convolving the sharp image ($P_S$) with a candidate blur kernel (K).

In the preferred embodiment of the present invention, this MAP problem is solved by the well-known conjugate gradient method to determine the blur kernel that minimizes the energy by solving the partial differential equation (PDE):

$$\frac{\partial E(K)}{\partial K} = 0 \quad (3)$$

For more information on solving PDEs using the conjugate gradient method, please refer to the aforementioned article "Image and depth from a conventional camera with a coded aperture" by Levin et al.

In a preferred embodiment of the present invention, a multi-scale approach is used based on a hierarchy of scaled images to avoid being trapped in local minimum during the optimization. With this multi-scale approach, an iterative process is used that sequentially optimizes an estimate of the blur kernel at a series of scales, starting with a coarse image scale. It has been found that 2 or 3 different scales usually work well, where each scale differs by a factor of 2.

At the coarsest scale, an initialize blur kernel step 415 is used to initialize the blur kernel 225 (K) as a square kernel of a predefined extent having equal elements. A down-sample images step 420 is used to down-sample the blurred grayscale image 405 and the sharp grayscale image 410 to the current scale. For example, if 3 scales are used, the first iteration would require a 4× down-sampling, the second iteration would require a 2× down-sampling, and the third iteration would use the full-resolution images.

Next, an update blur kernel step 425 is used to compute a new estimate of the blur kernel 225 by solving the PDE given in Eq. (3) using the conjugate gradient method, where the blur kernel from the previous iteration is used as the initial guess for the PDE solution. An optional threshold blur kernel step 430 (shown with dashed lines) can be used to threshold small blur kernel elements (e.g. less than 0.1% of total energy) to reduce the noise of estimation. A normalize blur kernel step 435 is used to normalize the estimated blur kernel so that the blur kernel elements sum to 1.0. A test 440 is used to determine whether there are additional scales that need to be processed. If there are additional scales, the current estimate of the blur kernel is up-sampled to the next scale using an up-sample blur kernel step 445. This can be performed using any well-known interpolation technique such as bi-cubic interpolation. When there are no more scales left to process, an output blur kernel step 450 is used to output the final estimate of the blur kernel 225.

In a preferred embodiment of the present invention, the compute deblurred image step 245 uses a Bayesian inference method with Maximum-A-Posterior (MAP) estimation. Using the method, the deblurred image 250 is determined by defining an energy function of the form:

$$E(L) = (L \otimes K - B)^2 + \lambda_1 w |\nabla L|^2 + \lambda_2 \sum_j c_j (\partial_j L - \partial_j S)^2 \quad (4)$$

where L is the deblurred image 250, K is the blur kernel 225, B is the blurred image 205, S is the sharp image 215, j is an index value, $\otimes$ is the convolution operator, $|\bullet|$ is the absolute value operator, $\nabla$ is the gradient operator, $\partial_j$ is a differential operator corresponding to the $j^{th}$ index, w is a pixel-dependent weighting factor, and $\lambda_1$, $\lambda_2$ and $c_j$ are weighting coefficients.

Figure 5:
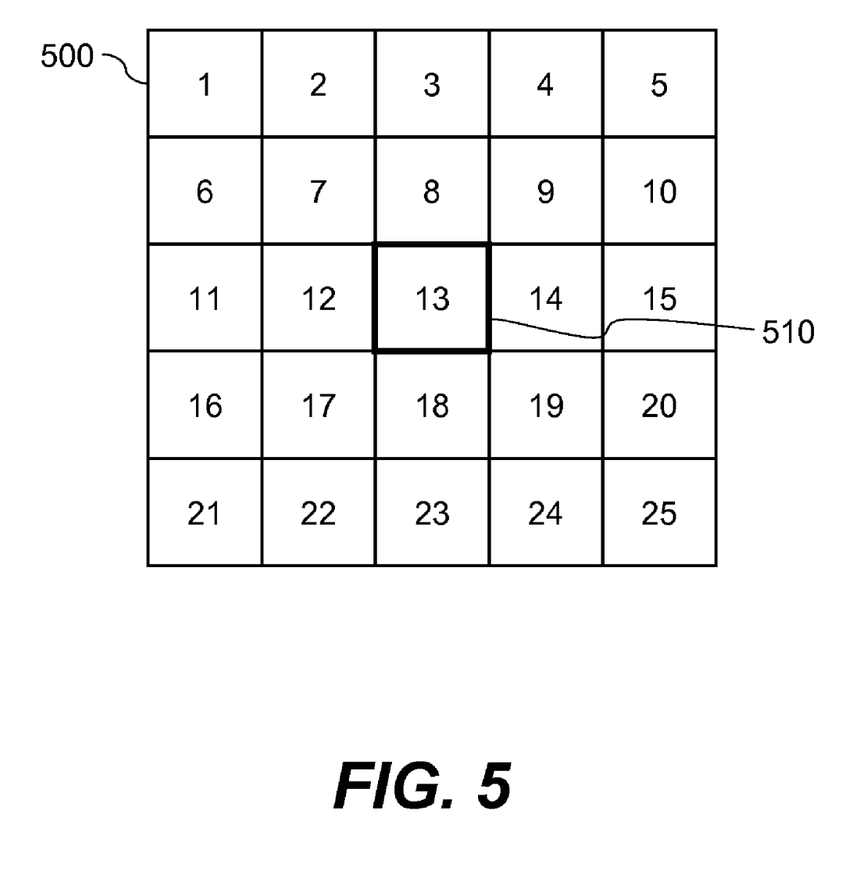
FIG. 5 shows an array of indices that can be used to determine the reference differential images.

The index j is used to identify a neighboring pixel for the purpose of calculating a difference value. In a preferred embodiment of the present invention difference values are calculated for a 5×5 window of pixels centered on a particular pixel. FIG. 5 shows an array of indices 500 centered on a current pixel location 510. The numbers shown in the array of indices 500 are the indices j. For example, an index value of j=6 corresponds top a pixel that is 1 row above and 2 columns to the left of the current pixel location 510.

The differential operator $\partial_j$ determines a difference between the pixel value for the current pixel, and the pixel value located at the relative position specified by the index j. For example, $\partial_6 S$ would correspond to a differential image determined by taking the difference between each pixel in the sharp image S with a corresponding pixel that is 1 row above and 2 columns to the left. In equation form this would be given by:

$$\partial_j S = S(x, y) - S(x - \Delta x_j, y - \Delta y_j) \quad (5)$$

where $\Delta x_j$ and $\Delta y_j$ are the column and row offsets corresponding to the $j^{th}$ index, respectively. The set of differential images $\partial_j S$ can be referred to as reference differential images because they represent an estimate of the desired differential images that should be produced for the deblurred image 250. The compute reference differential images step 230 is used to determine a set of reference differential images 235 using Eq. (5). Generally, it will be desirable for the set of reference differential images 235 to include one or more horizontal differential images representing differences between neighboring pixels in the horizontal direction and one or more vertical differential images representing differences between neighboring pixels in the vertical direction, as well as one or more diagonal differential images representing differences between neighboring pixels in a diagonal direction.

The first term in the energy function given in Eq. (4) is an image fidelity term. In the nomenclature of Bayesian inference, it is often referred to as a "likelihood" term. It can be seen that this term will be small when there is a small difference between the blurred image 205 (B) and a blurred version of the deblurred image (L) which as been convolved with the blur kernel 225 (K).

The second and third terms in the energy function given in Eq. (4) are often referred to as "image priors." The second term will have low energy when the magnitude of the gradient of the deblurred image 250 (L) is small. This reflects the fact that a sharper image will generally have more pixels with low gradient values as the width of blurred edges is decreased. For reasons discussed in the aforementioned article "Image and depth from a conventional camera with a coded aperture" by Levin et al., it is desirable for the pixel-dependent weighting factor w to be determined using the equation:

$$w = |\nabla L|^{\alpha - 2}. \qquad (6)$$

where $\alpha$ is a constant (e.g., 0.8). During the optimization process, $\nabla L$ can be calculated for each iteration using the estimate of L determined for the previous iteration. Alternately, the sharp image 215 (S) can be used as an estimate of the deblurred image 250 (L).

The third term in the energy function given in Eq. (4) computes differences between the reference differential images 235 ($\partial_j S$) and differential images computed for the deblurred image ($\partial_j L$). This term can be referred to as an image differential term. Contributions are determined for each of the reference differential images 235, and the contributions are then weighted and summed to determine a single energy term. The energy corresponding to this term will be low when the differential images for the deblurred image ($\partial_j L$) are approximately equal to the reference differential images 235 ($\partial_j S$).

Other researchers have utilized energy function consisting of the first two terms in the energy function shown in Eq. (4). (For example, see the aforementioned article "Image and depth from a conventional camera with a coded aperture" by Levin et al.) The addition of the third term in the energy function containing the reference differential images represents a significant advantage over the energy functions described in the prior art. In particular, it has been found that the use of this term substantially improves the quality of the deblurred image 250 by reducing ringing artifacts that prior art methods are prone to produce near edges in the image.

The compute deblurred image step 245 computes the deblurred image 250 by minimizing the energy function given in Eq. (4) using optimization methods that are well known to those skilled in the art. In a preferred embodiment of the present invention, the optimization problem is formulated as a PDE given by:

$$\frac{\partial E(L)}{\partial L} = 0. \qquad (7)$$

which can be solved using conventional PDE solvers. In a preferred embodiment of the present invention, a PDE solver is used where the PDE is converted to a linear equation form that can be solved using a conventional linear equation solver, such as a conjugate gradient algorithm. For more details on solving PDE solvers, refer to the aforementioned article "Image and depth from a conventional camera with a coded aperture" by Levin et al.

It will be understood by one skilled in the art that the compute deblurred image step 245 can use other techniques besides Bayesian inference methods. For example, conventional frequency-domain deconvolution methods can be used where the blurred image 205 is transformed to the frequency domain and divided by a transfer function determined by transforming the blur kernel 225 to the frequency domain. The filtered image can then be transformed back to the spatial domain. Variations of this technique include the well-known Weiner filter.

The method of the present invention can be applied to any type of digital imaging system. In a preferred embodiment of the present invention, the method is implemented as part of a digital still camera system. The method may be implemented by a processor in the digital still camera, or alternately may be implemented wholly or in part by a processor external to the digital still camera, such as a personal computer. The method of the present invention can also be used to process digital video images. In this case, frames of the digital video can be captured with alternating short and long exposure times, and pairs of video frames can be processed to form deblurred images.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

110 Data processing system
120 Peripheral system
130 User interface system
140 Data storage system
200 Receive blurred image step
205 Blurred image
210 Receive sharp image step
215 Sharp image
220 Estimate blur kernel step
225 Blur kernel
230 Compute reference differential images step
235 Reference differential images
245 Compute deblurred image step
250 Deblurred image
255 Store deblurred image step 270 Short exposure time
280 Longer exposure time
400 Pre-process images step
405 Blurred grayscale image
410 Sharp grayscale image
415 Initialize blur kernel step
420 Down-sample images step
425 Update blur kernel step
430 Threshold blur kernel step
435 Normalize blur kernel step
440 Test
445 Up-sample blur kernel step
450 Output blur kernel step
500 Array of indices
510 Current pixel location

The invention claimed is:

1. A method for determining a deblurred image, the method implemented at least in part by a data processing system and comprising:
   a) receiving a sharp image of a scene captured with a short exposure time;
   b) receiving a blurred image of the scene captured with a longer exposure time than the sharp image, wherein the blurred image has a higher level of motion blur than the sharp image;
   c) determining a blur kernel responsive to the sharp image and the blurred image;
   d) determining one or more reference differential images responsive to the sharp image, wherein each pixel of a particular reference differential image is determined by computing a difference between the corresponding pixel in the sharp image and a nearby pixel in the sharp image at a predefined relative position, wherein each differential digital image is associated with a different predefined relative position;
   e) defining an energy function that includes an image differential term that is a function of differences between the reference differential images and a corresponding set of candidate differential images computed for a candidate deblurred image, wherein the candidate differential images for the candidate deblurred image are computed using the predefined relative positions associated with the corresponding reference differential images;
   f) determining a deblurred image responsive to the blurred image and the blur kernel by evaluating candidate deblurred images using the energy function; and
   g) storing the deblurred image in a processor-accessible memory system.

2. The method of claim 1 wherein the blur kernel is determined by using an optimization method to minimize an energy function which includes a term that is a function of a difference between the blurred image and a candidate blurred image determined by convolving the sharp image with a candidate blur kernel.

3. The method of claim 2 wherein the blur kernel is determined by analyzing only a subset of image pixels in the sharp image and a corresponding subset of image pixels in the blurred image, wherein the subsets are determined to contain significant image detail.

4. The method of claim 3 wherein the subset of the image pixels in the sharp image is selected by:
   determining a Laplacian image from either the sharp image or the blurred image or both; and
   selecting the subset of image pixels in the sharp image and the corresponding subset of image pixels in the blurred image by analyzing the Laplacian image to determine a subset of image pixels containing significant image detail.

5. The method of claim 4 wherein the subset of image pixels include pixels in the Laplacian image that exceed a predefined threshold.

6. The method of claim 2, wherein a denoising algorithm or a tone scale adjustment algorithm or both are applied to the sharp image before it is used to determine the blur kernel.

7. The method of claim 2, wherein the blur kernel is determined by analyzing multiple resized versions of the sharp image and the blurred image having different resolutions.

8. The method of claim 1 wherein the one or more reference differential images include a horizontal differential image corresponding to a predefined relative position with a horizontal offset and a vertical differential image corresponding to a predefined relative position with a vertical offset.

9. The method of claim 1 wherein the deblurred image is determined using a Bayesian inference method.

10. The method of claim 9 wherein the Bayesian inference method includes evaluating candidate deblurred images using an energy function.

11. The method of claim 10 wherein the energy function includes:
   an image fidelity term which is a function of the difference between the blurred image and a candidate blurred image determined by convolving a candidate deblurred image with the blur kernel.

12. The method of claim 11 wherein the energy function further includes a term which is a function of a gradient of the candidate deblurred image.

13. The method of claim 10 wherein the energy function is optimized using a conjugate gradient algorithm.

14. The method of claim 1 wherein the deblurred image is determined using a frequency domain deconvolution method.

15. The method of claim 1 further including applying an affine transform to the sharp image or the blurred image to better align the sharp image with the blurred image.

16. The method of claim 1 wherein the sharp image and the blurred image are captured sequentially using a digital camera in response to a single button press.

17. The method of claim 16 wherein the motion blur is at least partially due to motion of the digital camera during the time that the sharp image and the blurred image are captured.

18. The method of claim 16 wherein the motion blur is at least partially due to motion of objects in the scene during the time that the sharp image and the blurred image are captured.

19. The method of claim 1 wherein the sharp image and the blurred image are frames of a digital video.

20. A digital camera system comprising:
   an image sensor for capturing an image of a scene;
   an lens system for imaging the scene onto the image sensor;
   a processor-accessible memory system;
   a data processing system for performing the steps of:
      receiving a sharp image of a scene captured with a short exposure time;
      receiving a blurred image of the scene captured with a longer exposure time than the sharp image, wherein the blurred image has a higher level of motion blur and a lower level of image noise than the sharp image;
      determining a blur kernel responsive to the sharp image and the blurred image;
      determining one or more reference differential images responsive to the sharp image, wherein each pixel of a particular reference differential image is determined by computing a difference between the corresponding pixel in the sharp image and a nearby pixel in the sharp image at a predefined relative position, wherein each reference differential image is associated with a different predefined relative position;

defining an energy function that includes an image differential term that is a function of differences between the reference differential images and a corresponding set of candidate differential images computed for a candidate deblurred image, wherein the candidate differential images for the candidate deblurred image are computed using the predefined relative positions associated with the corresponding reference differential images;

determining a deblurred image responsive to the blurred image and the blur kernel by evaluating candidate deblurred images using the energy function; and storing the deblurred image in a processor-accessible memory system.

21. A computer program product for determining a deblurred image comprising an executable software application stored in a non-transitory processor readable medium for causing a data processing system to perform the steps of a) receiving a sharp image of a scene captured with a short exposure time;

b) receiving a blurred image of the scene captured with a longer exposure time than the sharp image, wherein the blurred image has a higher level of motion blur than the sharp image;

c) determining a blur kernel responsive to the sharp image and the blurred image;

d) determining one or more reference differential images responsive to the sharp image, wherein each pixel of a particular reference differential image is determined by computing a difference between the corresponding pixel in the sharp image and a nearby pixel in the sharp image at a predefined relative position, wherein each reference differential image is associated with a different predefined relative position;

e) defining an energy function that includes an image differential term that is a function of differences between the reference differential images and a corresponding set of candidate differential images computed for a candidate deblurred image, wherein the candidate differential images for the candidate deblurred image are computed using the predefined relative positions associated with the corresponding reference differential images;

f) determining a deblurred image responsive to the blurred image and the blur kernel by evaluating candidate deblurred images using the energy function; and g) storing the deblurred image in a processor-accessible memory system.

* * * * *

UNITED STATES PATENT AND TRADEMARK OFFICE
CERTIFICATE OF CORRECTION

PATENT NO. : 8,390,704 B2  Page 1 of 1
APPLICATION NO. : 12/580569
DATED : March 5, 2013
INVENTOR(S) : Wang et al.

It is certified that error appears in the above-identified patent and that said Letters Patent is hereby corrected as shown below:

On the Title Page, Item (75), under "Inventors", in Column 1, Lines 1-2, delete "Hou Tingbo," and insert -- Tingbo Hou, --, therefor.

On the Title Page, Item (56), under "OTHER PUBLICATIONS", in Column 2, Line 11, delete "photgraph,"" and insert -- photograph," --, therefor.

On Title Page 2, Item (56), under "OTHER PUBLICATIONS", in Column 2, Line 3, delete "wit" and insert -- with --, therefor.

In the Specification

In Column 8, Line 56, delete "top a" and insert -- to a --, therefor.

In Column 9, Line 21, delete "as been" and insert -- has been --, therefor.

In the Claims

In Column 13, Line 20, in Claim 21, delete "steps of" and insert -- steps of: --, therefor.

Signed and Sealed this
Eleventh Day of March, 2014

Michelle K. Lee
*Deputy Director of the United States Patent and Trademark Office*